Dec. 16, 1924.
H. L. ADAMS
1,519,894
TIRE CARRIER
Filed Feb. 19, 1923     2 Sheets-Sheet 1
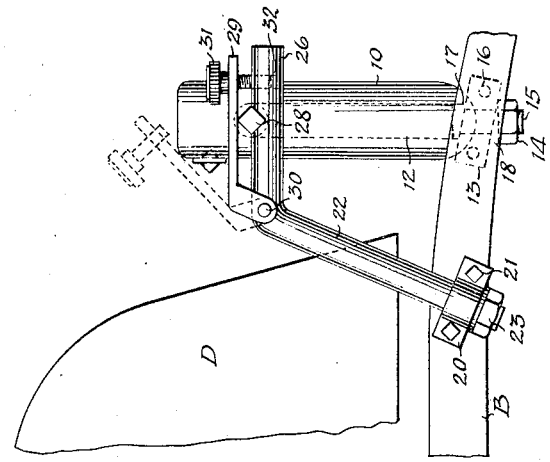
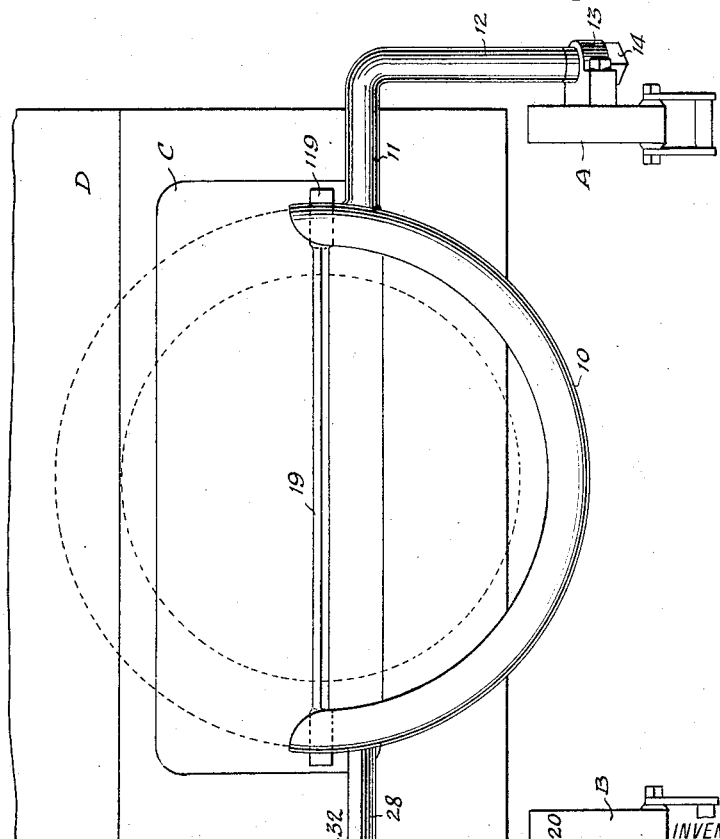
INVENTOR
H. L. ADAMS
ATTORNEYS Dec. 16, 1924.
H. L. ADAMS
TIRE CARRIER
Filed Feb. 19, 1923
1,519,894
2 Sheets-Sheet 2
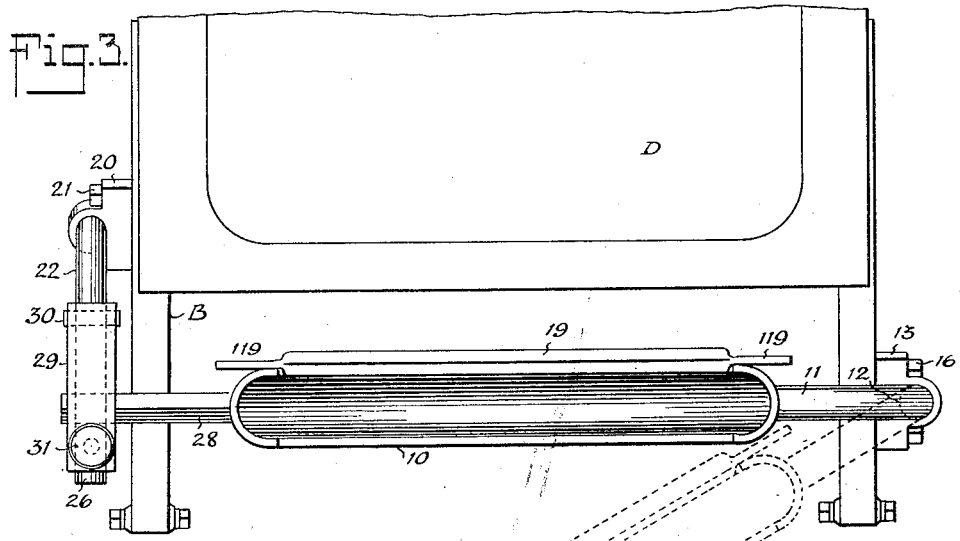
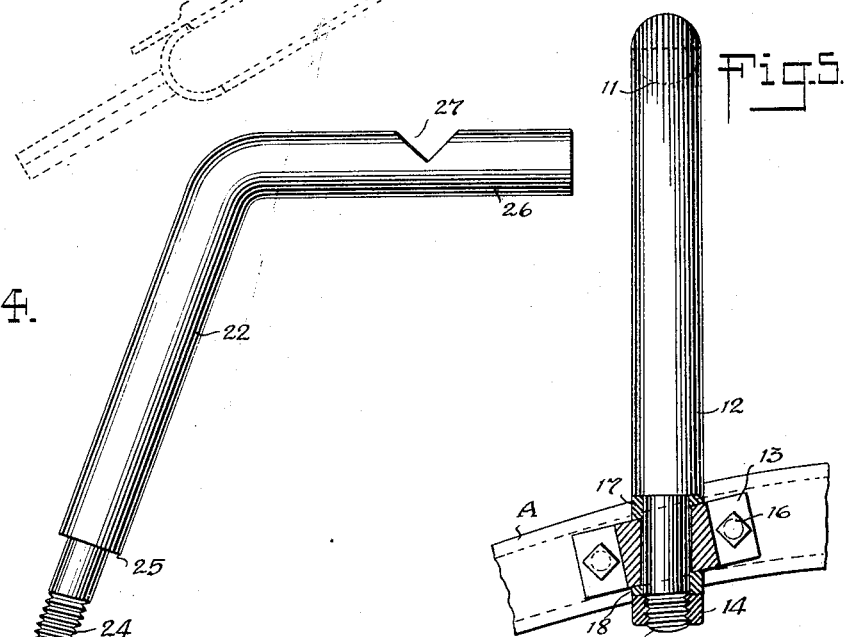
WITNESSES
INVENTOR
H. L. ADAMS
BY
ATTORNEYS Patented Dec. 16, 1924.

1,519,894

UNITED STATES PATENT OFFICE.

HENRY LEROY ADAMS, OF HOOSICK, NEW YORK.

TIRE CARRIER.

Application filed February 19, 1923. Serial No. 620,052.

*To all whom it may concern:*

Be it known that I, HENRY L. ADAMS, a citizen of the United States of America, and a resident of Hoosick, in the county of Rensselaer and State of New York, have invented a new and Improved Tire Carrier, of which the following is a description.

My invention relates to a device for carrying a spare tire on an automobile and more particularly the invention relates to a device especially adapted to automobiles of the coupé or roadster type which have storage space at the rear for luggage.

The general object of my invention is to provide a carrier that may be employed on any automobile but which when employed on a coupé or roadster will permit of the carrier being swung away from the storage space at the rear to afford clear access to such space when desired.

Reference is to be had to the accompanying drawings forming a part of this specification, it being understood that the drawings are merely illustrative of one example of the invention.

Figure 1 is an elevation of a tire carrier embodying my invention showing the same mounted at the rear of an automobile illustrated in part;

Figure 2 is a side elevation of the carrier and fragments of the automobile;

Figure 3 is a plan view;

Figure 4 is a side elevation of the supporting element employed at one side of the automobile;

Figure 5 is an end elevation of the supporting element employed at the opposite side of the automobile.

In carrying out my invention in accordance with the illustrated example the carrier or tire receiving saddle 10 is semi-circular and U-shape in cross section in common with many carriers. At one end a supporting element 11 rigid with the carrier extends laterally outward and has its outer end integral with a vertical post 12 so that the element is L-shape. The post or vertical member 12 has its reduced lower end passed through a block 13 secured to the frame bar A of the chassis. The threaded extreme lower end 15 of the post 12 receives a nut 14 at the under side of the block 13. Said block 13 is secured to the frame bar A in any suitable manner, there being shown bolts 16 for the purpose. The portion of the frame bar A to which the block 13 is secured dips at its rear end in the ordinary car and the block 13 is inclined accordingly to follow the general dipping lines of the frame bar. The hole in the block 13, however, through which the reduced lower end of the post 12 extends is vertical in order that said post may turn about a vertical axis. In practice I may, as shown, employ a wedge-shaped washer 17 between the block 13 and the shoulder on the post 12 at the base of the reduced lower end and may employ a similar wedge-shaped washer 18 between nut 14 and the block 13 all as shown clearly in Figure 5.

In order to strengthen the saddle 10 I provide at the top thereof at one side surface of the saddle a bar 19 which may be hollow, that is to say, in the form of a rectangular tube, the ends 119 of which bar are flattened as shown and welded or otherwise rigidly fastened to the saddle at each end.

At the side of the automobile opposite to that at which the block 13 is disposed, a similar block 20 is secured by bolts 21 to the adjacent side bar B of the automobile frame and advantageously in a plane forward of the vertical plane passing through the block 13. Said block 21 receives an oblique post 22 the reduced threaded lower end 24 of which passes through the block 20 and receives a nut 23. At the upper end the post 22 is formed with a rearwardly extending terminal arm 26 which has a notch 27 preferably V-shaped in its upper edge. The notch 27 receives a laterally extending member 28 rigid with the saddle 10, at the opposite end from the arm 11 whereby the carrier at the end having the member 28 receives support on the horizontal arm 26.

To latch the member 28 to its seat in the notch 27 of arm 26 I provide a latch plate 29 pivoted as at 30 at one end on the post 22 at the inner end of the rearwardly extending arm 26. Said latch 29 adjacent to its free end carries a screw 31 having a milled head or equivalent means for turning. Said screw is adapted to engage in a threaded hole 32 tapped vertically in the arm 26 rearwardly of the notch 27. When the latch 29 is lowered onto the member 28 of saddle 10 and the screw 31 engaged with the arm 26 the saddle is firmly held at that end.

The letter C indicates conventionally a luggage compartment in the back of an automobile (D) of the coupé or roadster type. In its normal position the carrier parts extend across the luggage compartment C but it will be clear that by disengaging the screw 31 from the arm 26 and raising the latch 29 the supporting member 28 of carrier 10 may be lifted from the arm 26 and the said carrier swung away from the back of the automobile at one side thereof about the axis of the post 12. When the luggage compartment has been again closed the carrier is again swung to a position across the back of the automobile and with the member 28 resting on the arm 26 whereupon the latch 29 may be lowered and the screw 31 engaged with the arm 26 to securely hold the carrier in position.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:

A tire carrier including a saddle, an element rigid with the carrier at one end, a depending portion on said element, a block having a hole to turnably receive the lower end of said post, said hole being approximately vertical, means to mount said block on a downwardly extending portion of a side bar of an automobile frame, a wedge-shaped washer on said block through which washer said depending portion passes, and means adapted to be mounted on the automobile at the opposite side from the said block, to support the adjacent end of the carrier.

HENRY LEROY ADAMS.